Oct. 27, 1931.   F. W. NUERWELL   1,829,107
TRANSPLANTER
Filed Oct. 11, 1930
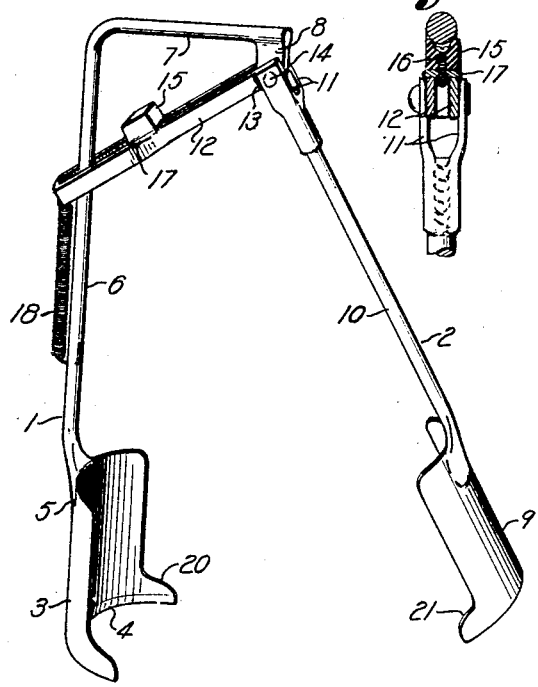
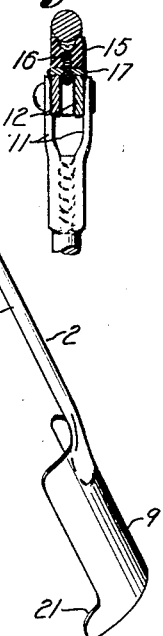
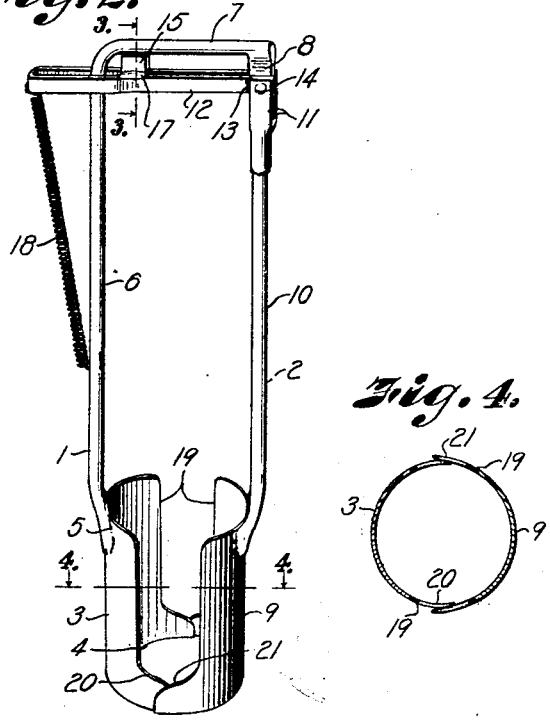
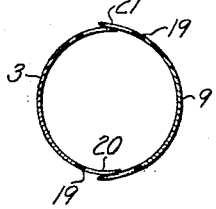
INVENTOR
Frederick W. Nuerwell
BY
Arthur C. Brown
ATTORNEY Patented Oct. 27, 1931

1,829,107

UNITED STATES PATENT OFFICE

FREDERICK W. NUERWELL, OF TULSA, OKLAHOMA

TRANSPLANTER

Application filed October 11, 1930. Serial No. 488,018.

My invention relates to transplanters and more particularly to a device of that character for transplanting small trees, shrubs, flowers, herbaceous plants and the like, the principal objects of my invention being to provide a transplanter that may be readily operated with one hand, that is simple in construction and that can be manufactured at low cost.

A further object of the invention is to embody shock absorbing means in a device of this character in order to facilitate smooth and efficient operation thereof.

In accomplishing these and other objects of my invention I have provided improved details of structure the preferred forms of which are illustrated in the accompanying drawings, wherein:

Fig. 1 is a perspective view of my preferred form of the transplanter shown in fully opened condition.

Fig. 2 is a perspective view of the device in closed position.

Fig. 3 is a cross section on the line 3—3 Fig. 2.

Fig. 4 is a cross section on the line 4—4 Fig. 2.

Referring more in detail to the drawings:

The transplanter is formed of cooperating stationary and movable members 1 and 2, the stationary member including a shovel 3, circular in form and having an outwardly tapering lower cutting edge 4. Secured to its upper edge by welding or the like, as indicated at 5 is a handle 6, preferably formed of a solid steel rod and terminating in a lateral grip portion 7 having a downwardly depending ear 8 on the extreme outer end thereof.

The movable member 2 comprises a shovel 9, complementary to the shovel 3 for cooperating therewith, a handle 10 being fixed on its upper edge. Secured to the upper end of the handle 10, on opposite sides thereof, by welding or the like, are plates 11 forming a yoke for receiving the outer ends of a U-shaped bar 12 extending over the handle 6 and being formed integral with the yoke by means such as welding, as indicated at 13. The U-shaped member 12 extends at right angles from the movable handle and its closed end projects around and beyond the stationary handle to permit outward movement of the movable member.

The stationary and movable members are pivotally connected by extending a rivet 14 through aligning openings in the yoke plates 11 and ear 8 so that the bar 12 serves as a grip member for cooperating with grip portion 7 of the stationary member.

In order to protect the operator from shocks or jars incident to manipulation of the device a resilient block 15, formed of rubber or the like, is preferably secured by a screw 16 to a cross plate 17 fixed to the upper edge of the bar 12.

Means for normally maintaining the transplanter in opened condition comprises a spring 18 having opposite ends fixed respectively to the handle 6 and to the closed end of the bar 12.

Attention is particularly directed to the structure of the shovels which are cut away or recessed, as indicated at 19, for forming perpendicular notches leaving lower, downwardly slanting ears 20 and 21 on the shovels 3 and 9 respectively, the notches being provided for receiving the horizontal extending branches or vines of plants. The ears 21 are preferably of slightly greater diameter to receive the ears 20 so that a complete circle will be cut when inserting the tool into the ground.

In transplanting shrubs or the like with a device constructed and assembled as described the operation would be as follows:

The shovel of the stationary member is positioned concentrically adjacent one side of the plant, the horizontal vines or branches being forced upwardly over the extension ears and into the recessed portion of the shovel. The operator, by grasping the grip portion of the stationary member and pulling upwardly on the U-shaped bar draws the movable shovel against the opposite side of the plant, and the cooperating shovels then in closed condition, are forced into the soil. When the desired depth has been reached, the operator, by exerting additional pressure on the grip member slightly depresses the resilient block, thereby causing the cylinder of earth containing the plant to be securely clamped between the shovels so that the cylinder and plant may be readily removed from the ground.

It is obvious that outwardly extending roots of the plant will be pruned by the shovels, however, a sufficient amount of soil and roots are removed with the plant for transplanting purposes.

The device is also particularly adapted for removing small plants of cotton or like crops from rows or sections of rows where the stand is too thick in order to transplant such plants into rows where the stand is too thin.

What I claim and desire to secure by Letters Patent is:

1. In a transplanter, a stationary member including a shovel, a handle secured to said shovel and terminating in a laterally extending grip portion having a downwardly depending ear, a movable member including a complementary shovel, a handle secured to the complementary shovel, and having a laterally extending grip portion including a free end engageable with the first named handle to limit downward movement of the last named grip portion, and means for pivotally connecting the movable member to said ear.

2. In a transplanter, a stationary member including a shovel, a handle secured to said shovel and terminating in a laterally extending grip portion, a movable member including a complementary shovel, a handle secured to the complementary shovel, and having a laterally extending grip portion including a loop end mounted over the first named handle and engageable therewith to limit downward movement of said last named grip portion, and means for pivotally connecting the stationary and movable members.

3. In a transplanter, a stationary member including a shovel, a handle secured to said shovel and terminating in a laterally extending grip portion, a movable member including a complementary shovel, a handle secured to the complementary shovel, and having a laterally extending grip portion for cooperating with said first-named grip portion including a loop end mounted over the first named handle and engageable therewith to limit downward movement of said last named grip portion, and a spring connecting said loop end and the first named handle to normally maintain said loop in engagement with the first named handle.

4. In a transplanter, a stationary member including a shovel, a handle secured to said shovel and terminating in a laterally extending grip portion having a downwardly depending ear, a movable member including a complementary shovel, a handle secured to the complementary shovel and having a laterally extending grip portion including a free end engageable with the first named handle to limit downward movement of the last named grip portion, means for pivotally connecting the movable member to said ear, and resilient means on said last named grip portion adapted to engage the grip portion of the first named handle to limit downward movement of the last named handle.

5. In a transplanter, a stationary member including a shovel, a handle secured to said shovel and terminating in a laterally extending grip portion having a downwardly depending ear, a movable member including a complementary shovel, a handle secured to the complementary shovel and terminating in a fork, a lateral U-shaped member having its open end secured to the fork for receiving said ear and its closed end mounted over the handle of said stationary member, and means for pivotally connecting said fork to the depending ear.

6. In a transplanter, a stationary member including a shovel, a handle secured to said shovel and terminating in a laterally extending grip portion having a downwardly depending ear, a movable member including a complementary shovel, a handle secured to the complementary shovel and terminating in a fork, a lateral U-shaped member having its open end secured to the fork for receiving said ear, and its closed end mounted over the handle of said stationary member, means for pivotally connecting said fork to the depending ear, and yielding means connected to the stationary handle and to the U-shaped member for normally maintaining the respective shovels in opened condition.

7. In a transplanter, a stationary member including a shovel having lower extension ears, said ears having downwardly slanting upper edges, a handle secured to said shovel and terminating in a laterally extending grip portion, a movable member including a corresponding shovel, the ears of one shovel being spaced more than the ears of the other shovel to permit an overlapping relation of the ears, a handle secured to the complementary shovel and having a laterally extending grip portion, and means for pivotally connecting the stationary and movable members.

8. In a transplanter, a stationary member including a shovel, a handle secured to said shovel and terminating in a laterally extending grip portion having a downwardly depending ear, a movable member including a complementary shovel, a handle secured to the complementary shovel, and having a laterally extending grip portion, means for pivotally connecting the movable member to said ear, and a resilient block on one grip portion and adapted to be engaged by the other grip portion when the respective shovels are in closed condition.

9. In a transplanter, a stationary member including a shovel, a handle secured to said shovel and terminating in a laterally extending grip portion having a downwardly depending ear, a movable member including a complementary shovel, a handle secured to the complementary shovel and terminating in a fork, a lateral U-shaped member having its open end secured to the fork for receiving said ear, and its closed end mounted over the handle of said stationary member, means for pivotally connecting said fork to the depending ear, a resilient block on the U-shaped member adapted to be engaged by the grip portion, and yielding means connecting the stationary and movable members for normally maintaining the shovels in opened condition.

10. In a transplanter, a stationary member including a shovel having lower extension ears, a handle secured to said shovel including a laterally extending grip portion, a movable member including a complementary shovel, the ears of one shovel being spaced more than the ears of the other shovel to permit an overlapping relation of the ears, a handle secured to the complementary shovel and having a laterally extending grip portion, and means for pivotally connecting the stationary and movable members.

11. In a transplanter, a stationary member including a shovel, a handle secured to said shovel including a laterally extending grip portion, a movable member including a complementary shovel, a handle secured to the complementary shovel and having a laterally extending grip portion, means for pivotally connecting the stationary and movable members, and resilient means mounted between said grip portions adapted to be compressed after the shovels have been moved to closed position for clamping a ball of earth between the shovels.

12. In a transplanter, a member including a shovel having lower extension ears, a handle on said shovel, a movable member including a corresponding shovel, the ears of one shovel being spaced more than the ears of the other shovel to permit an overlapping relation of the ears, a handle secured to the complementary shovel, and means for pivotally connecting the stationary and movable members.

In testimony whereof I affix my signature.
FREDERICK W. NUERWELL.